(12) United States Patent  
Janzen

(10) Patent No.: US 9,342,512 B1  
(45) Date of Patent: May 17, 2016

(54) SYSTEM AND METHOD FOR REPAIRING DATA SYNCHRONIZATION LINKS

(71) Applicant: Doug Janzen, Vancouver (CA)

(72) Inventor: Doug Janzen, Vancouver (CA)

(73) Assignee: TASKTOP TECHNOLOGIES, INCORPORATED, Vancouver (CA)

( * ) Notice: Subject to any disclaimer, the term of this patent is extended or adjusted under 35 U.S.C. 154(b) by 418 days.

(21) Appl. No.: 13/834,365

(22) Filed: Mar. 15, 2013

(51) Int. Cl.  
*G06F 17/30* (2006.01)

(52) U.S. Cl.  
CPC .... *G06F 17/30008* (2013.01); *G06F 17/30575* (2013.01)

(58) Field of Classification Search  
None  
See application file for complete search history.

(56) References Cited

U.S. PATENT DOCUMENTS

| | | | |
|---|---|---|---|
| 5,301,320 A | | 4/1994 | McAtee et al. |
| 5,706,509 A | | 1/1998 | Man-Hak Tso |
| 5,970,501 A | | 10/1999 | Hunkins et al. |
| 6,393,434 B1 | * | 5/2002 | Huang et al. |
| 6,397,192 B1 | | 5/2002 | Notani et al. |
| 6,460,051 B1 | | 10/2002 | LaRue et al. |
| 6,477,545 B1 | * | 11/2002 | LaRue ........................ 707/625 |
| 6,505,200 B1 | | 1/2003 | Ims et al. |
| 7,013,315 B1 | * | 3/2006 | Boothby |
| 7,424,477 B1 | * | 9/2008 | Martin ..................... G06F 9/524 |
| 7,480,907 B1 | | 1/2009 | Marolia et al. |
| 7,496,606 B2 | | 2/2009 | Hind et al. |
| 7,516,167 B2 | | 4/2009 | Selman et al. |
| 7,565,381 B2 | | 7/2009 | Oswalt |
| 7,607,130 B2 | | 10/2009 | Singh et al. |
| 7,693,888 B2 | | 4/2010 | Urscheler et al. |
| 7,962,448 B2 | | 6/2011 | Creamer et al. |
| 8,131,672 B2 | | 3/2012 | Hind et al. |
| 8,315,976 B2 | | 11/2012 | Multer et al. |

(Continued)

FOREIGN PATENT DOCUMENTS

| EP | 2 169 552 A1 | 3/2010 |
|---|---|---|
| EP | 2160689 | 3/2010 |

OTHER PUBLICATIONS

Golbeck et al., "System and Method for Synchronizing States in Associated Data Records," U.S. Appl. No. 13/833,901, filed Mar. 15, 2013, 14 pages.

(Continued)

*Primary Examiner* — Sherief Badawi  
*Assistant Examiner* — Christopher J Raab  
(74) *Attorney, Agent, or Firm* — Seed IP Law Group PLLC

(57) ABSTRACT

A system for detecting and repairing errors in synchronization links for data records includes a first data repository containing a first data record that maintains a data field which links to associated data records) and a self-reference record. The system also includes a second data repository containing a second data record that also maintains a data field which links to associated data records) and a self-reference record. The system also includes a synchronizer that maintains a data table containing the addresses of the first and second data records and the status of any previous synchronization activity.

17 Claims, 5 Drawing Sheets

(56) References Cited

U.S. PATENT DOCUMENTS

| | | | |
|---|---|---|---|
| 2001/0056420 A1* | 12/2001 | Steele, Jr. | G06F 9/52 |
| 2002/0059299 A1* | 5/2002 | Spaey | 707/104.1 |
| 2004/0148299 A1 | 7/2004 | Teegan et al. | |
| 2006/0259517 A1* | 11/2006 | Urscheler et al. | 707/201 |
| 2007/0282802 A1 | 12/2007 | Wilhelm | |
| 2008/0212616 A1* | 9/2008 | Augustine et al. | 370/503 |
| 2009/0037452 A1* | 2/2009 | Baitalmal et al. | 707/101 |
| 2009/0077076 A1* | 3/2009 | Berger | G06F 17/30327 |
| 2010/0011337 A1 | 1/2010 | Young et al. | |
| 2010/0017792 A1 | 1/2010 | Young et al. | |
| 2010/0145910 A1 | 6/2010 | Zhao et al. | |
| 2010/0153423 A1* | 6/2010 | Lu | G06F 17/3038 707/759 |
| 2011/0047126 A1 | 2/2011 | Vargas et al. | |
| 2012/0271849 A1* | 10/2012 | Lesser et al. | 707/770 |

OTHER PUBLICATIONS

Golbeck et al., "System and Method for Synchronizing States in Associated Data Records," Preliminary Amendment filed Apr. 7, 2014, for U.S. Appl. No. 13/833,901, 20 pages.

Golbeck et al., "System and Method for Synchronizing States in Associated Data Records", Office Action mailed Mar. 25, 2015, for U.S. Appl. No. 13/833,901, 21 pages.

Kisynski et al., "Systems and Methods to Synchronize Artifact Relationships Across a Plurality of Repositories," U.S. Appl. No. 14/571,113, filed Dec. 15, 2014, 63 pages.

* cited by examiner

SYSTEM AND METHOD FOR REPAIRING DATA SYNCHRONIZATION LINKS

FIELD

The invention relates generally to a system and method for repairing data synchronization links between different data repositories.

BACKGROUND

Many computer software applications and development projects store a wide variety of data in multiple locations commonly referred to as "data repositories". In such independent data repositories, data linkages are used to determine similar data for the purpose of data synchronization. Synchronizing similar data stored in different data repositories requires either a synchronization system to store and maintain links between similar data records on different data repositories or requires each individual data repository to store links to similar data on other repositories. When a synchronization system stores links between similar data, a user of one data repository may have difficulty establishing a link to similar data on another data repository. When links are stored in individual data repositories, user and data errors can cause correspondences between similar data to be specified incorrectly, leading to synchronization errors. Consequently, a system and method for repairing data synchronization errors is needed.

SUMMARY

In some aspects, embodiments of the invention relate to a system for detecting and repairing errors in synchronization links for data records, comprising: a first data repository (R1) containing a first data record (DR1), where DR1 maintains a data field (FieldA) that links to associated data records and a self-reference record (SelfRefA) to detect any errors; a second data repository (R2) contain a second data record (DR2), where DR2 maintains a data field (FieldB) that links to associated data records and a self-reference record (SelfRefB) to detect any errors; a synchronizer that maintains a data table containing, the addresses of DR1 and DR2, and the status of any previous synchronization activity; where DR1 is associated with DR2; and where upon a change in DR1, the system, checks FieldA to determine the association with DR2, uses the entry in the data table to determine the address of DR2, checks FieldB of DR2 to determine if DR2 is linked with DR1, and corrects FieldB of DR2 if no link exists with DR1 by writing an address of DR2 that includes FieldA of DR1 into Field B of DR2.

In other aspects, embodiments of the invention relate to a method for detecting and repairing errors in synchronization links for data records, comprising: detecting a change in a first data record (DR1) located in a first data repository (R1), where DR1 maintains a data field (FieldA) that links to associated data records and a self-reference record (SelfRefA) to detect any errors; determining an association between DR1 with a second data record (DR2) located in a second data repository (R2), where DR2 maintains a data field (FieldB) that links to associated data records and a self-reference record (SelfRefB) to detect any errors; determining the address of DR2 by checking a data table located in a synchronizer, where the synchronizer that maintains the data table containing, the addresses of DR1 and DR2; checking FieldB of DR2 to determine if DR2 is linked with DR1; and correcting FieldB of DR2 if no link exists with DR1 by writing FieldA and the self-reference of DR2 into Field B of DR2.

Other aspects and advantages of various embodiments of the invention will be apparent from the following description and the appended claims.

BRIEF DESCRIPTION OF DRAWINGS

It should be noted that identical features in different drawings are shown with the same reference numeral.

DETAILED DESCRIPTION

A system and method for repairing data synchronization links has been developed. The embodiments of the present invention provide a system and method for repairing synchronization of similar data records stored in different data repositories when synchronization links are stored as part of data to be synchronized in each data repository.

Figure 1:
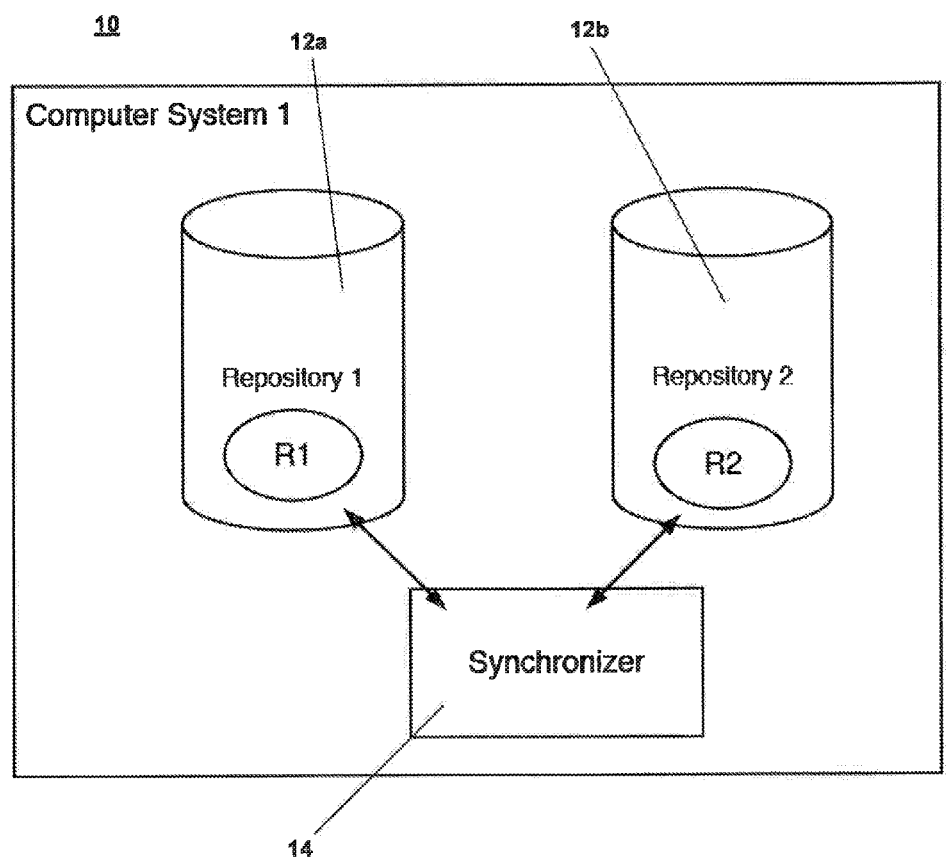
FIG. 1 is a diagram showing a single computer system with multiple data repositories in accordance with one embodiment of the present invention.
Figure 2:
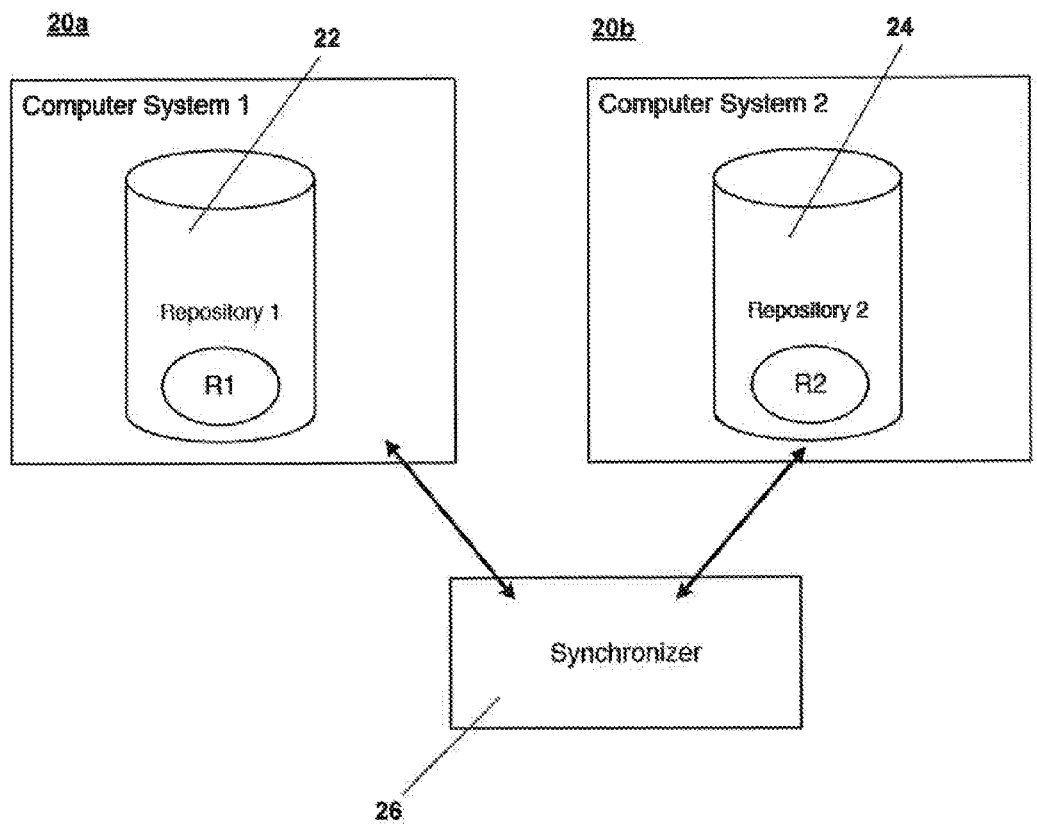
FIG. 2 is a diagram showing two separate computer systems each with a data repository in accordance with one embodiment of the present invention.

Embodiments of the present invention include multiple data repositories and a synchronizer that serves to synchronize the data links between the repositories. FIG. 1 shows a diagram of a single computer system with multiple data repositories in accordance with one embodiment of the present invention. In this embodiment, a single computer system 10 contains two independent data repositories 12a and 12b. The computer system 10 also includes a synchronizer 14 that is in communication with both repositories 12a and 12b. It should be understood that the data repositories are not limited to being part of a single computer system. Each repository could be located on a separate computer system as depicted in the embodiment shown in FIG. 2. In this example, two separate computer systems 20a and 20b each have a single respective data repository 22 and 24. These repositories 22 and 24 are in communication with a synchronizer 26 that is separate from each computer system 20a and 20b. It should be understood, that multiple computer systems with multiple data repositories could be used within the scope of the present invention. Also, multiple synchronizers could be used in such embodiments as well. In embodiments with multiple computer systems, a computer network links all computer systems hosting a data repository or synchronizer. In other embodiments, the computer systems may be smart phones, tablets or other mobile communication devices.

In one example embodiment of the present invention, the synchronizer maintains a "table" of URLs of similar data to be synchronized between two different data repositories. The table includes any number of rows. Each row of the table has two URLs identifying data records to be synchronized, the types of data repositories in which the data records are stored, a timestamp of the last time the data was synchronized and a state indicating the status of the last synchronization (e.g., OK or ERROR). In other embodiments, other types of data addresses or identification may be used instead of URLs. URLs are used where communication between different data repositories is across the internet or other network that could reference a URL to locate the appropriate data record. For embodiments using multiple data repositories, the rows of addresses will list all of the repositories containing similar data to be linked with each individual linkage having its own row. For example, if a first data record is linked to two other separate data records, two rows will be used: one row for the first and second data record; and a second row for the first and third data record.

Figure 3A:
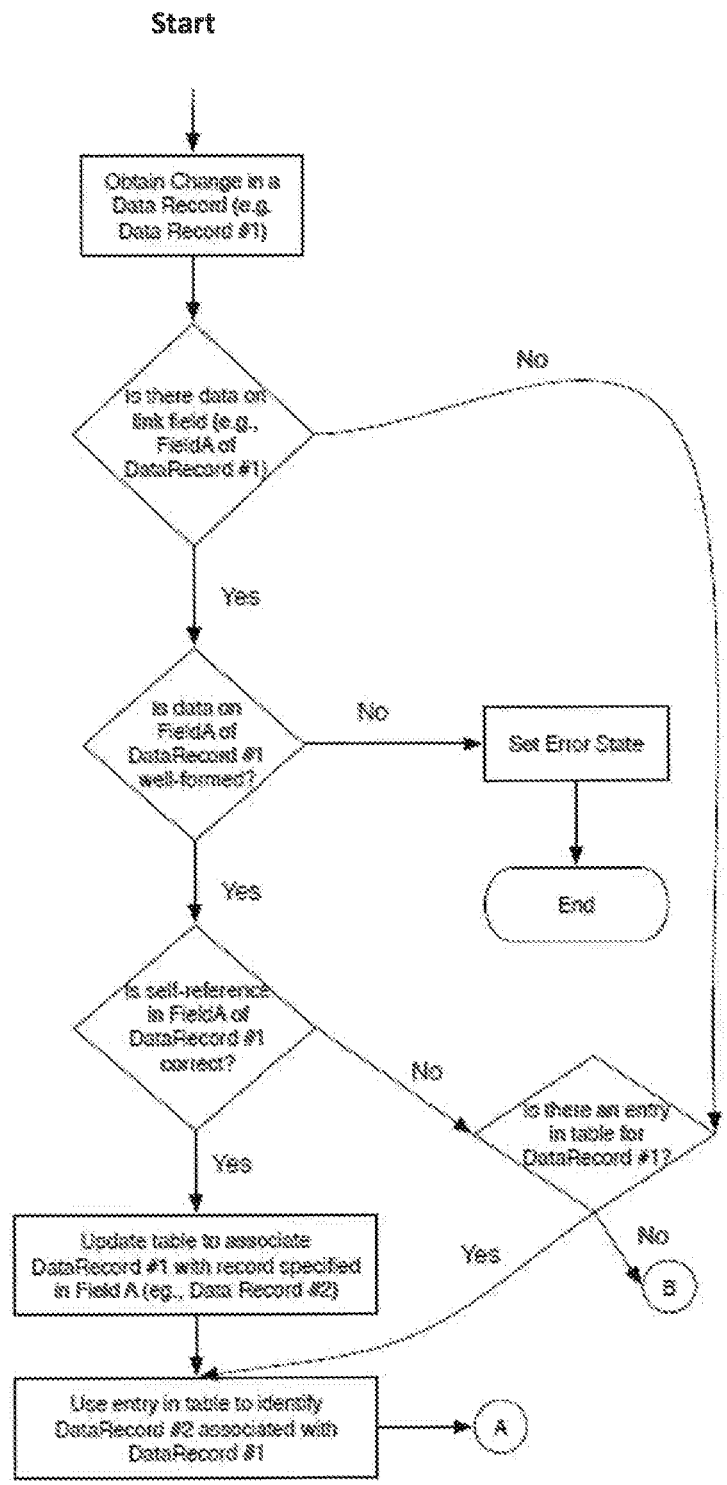
FIGS. 3A-3C are flow charts depicting a method of the repairing data linkages between repositories in accordance with one embodiment of the present invention.
Figure 3B:
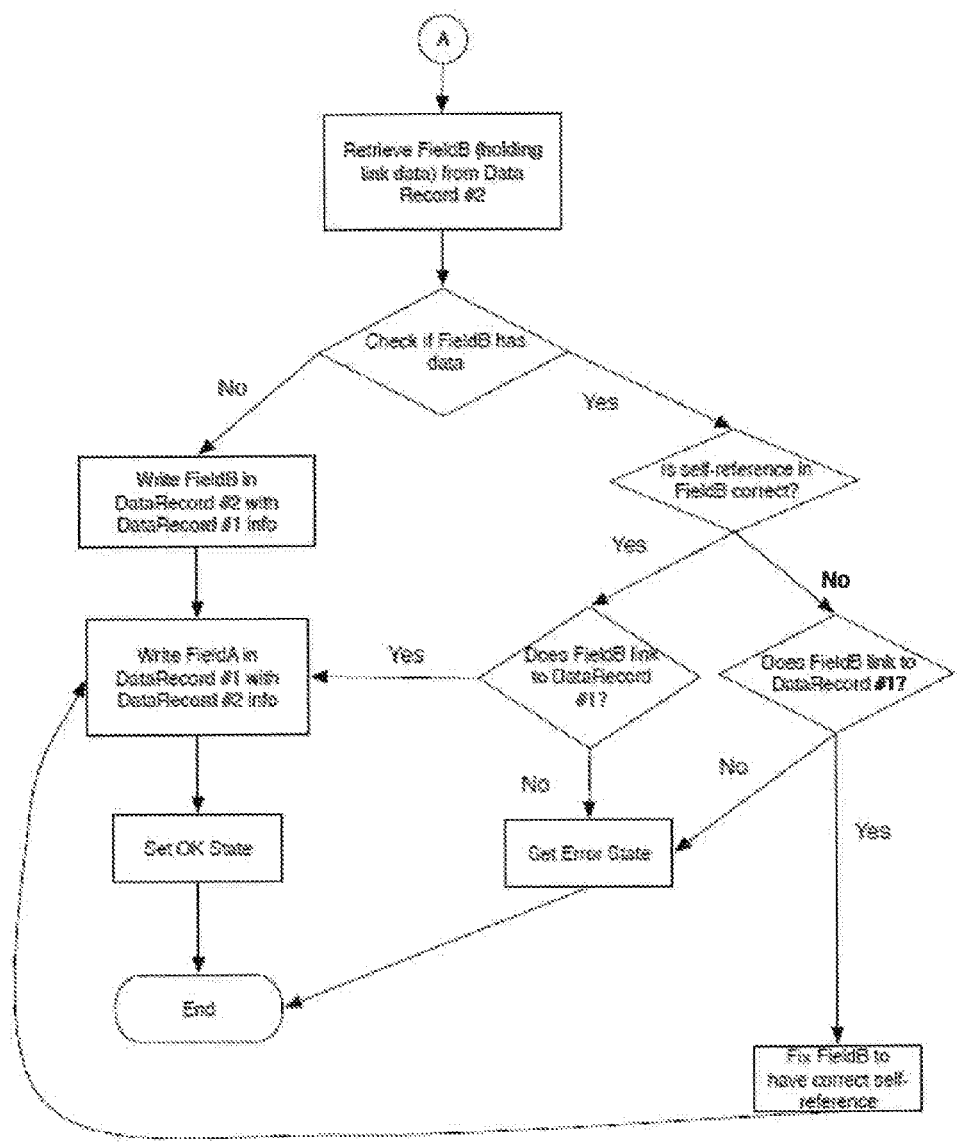
Figure 3C:
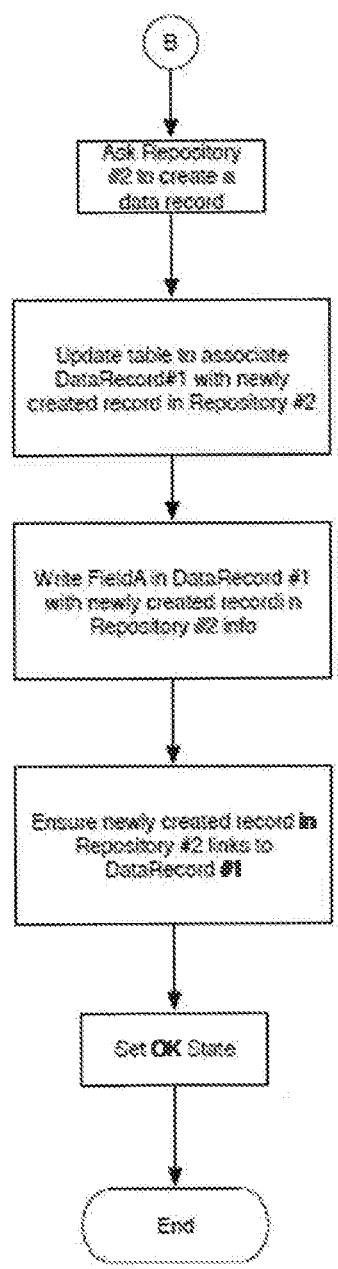

In some example embodiments of the present invention, each data record on each data repository participating in synchronization has one or more fields (e.g., "FieldA" on Data Records in Repository #1 and "FieldB" on data records in Repository #2 as referenced in FIGS. 3A-3C) to identify similar data on another data repositories to which it should be synchronized. A field identifying similar data includes the URL of the similar data, an identifier to indicate the type of data repository on which similar data resides and a "self-reference". A self-reference is a reference to the field identifying similar data. A self-reference is used to determine if a problem exists that necessitates a repair. The self-reference may contain a URL or other identifying identifier. Also, a data record within a repository can have many other fields, each of which links to similar data in another repository. This allows the synchronization and repair to be between more than two data records.

FIGS. 3A-3C are flow charts depicting a method of the repairing data linkages between repositories in accordance with an example embodiment of the present invention. Referring now to FIG. 3A, when a change is obtained to a data record (Data Record #1 or "DR1" of Repository #1 or "R1" in this example), the record is checked to see if there is data on the link field ("FieldA" of DR1) of the data record. In alternative embodiments, a data record may have more than one field identified and used as a link field. If nothing is in the FieldA, R1 is checked to see if there is a table entry for DR1. If no entry is present, the method will proceed to the procedures ("B") described in FIG. 3C. If a table entry for DR1 is present in R1, then the table entry is used to identify another data record (Data Record #2 or "DR2" of Repository #2 or "R2" in this example) and the method will proceed to the procedures ("A") described in FIG. 3B.

However, if data is present on the link field of DR1, the data in FieldA is examined to determine if it is well formed. "Well-formed" data will have: a self-reference field; a URL; and an identifier to indicate the type of data repository on which similar data resides. If the data is not well-formed, an error state is set and the process ends. If the data is well formed, the self-reference of FieldA is checked to determine if it is correct by double checking to ensure the URL in the self-reference field refers back to the same data record. If the self-reference field is not correct, R1 is checked to see if there is a table entry for DR1. If no entry is present, the method will proceed to the procedures ("B") described in FIG. 3C. If a table entry for DR1 is present in R1, then the table entry is used to identify associated DR2 and the method will proceed to the procedures ("A") described in FIG. 3B. If the self-reference field is correct, the table will be updated to associate DR1 with the DR2 that was specified in FieldA.

Referring now to FIG. 3B (labeled procedure "A"), the link field ("FieldB") of DR2 is retrieved and examined to see if it has any data. If FieldB does not have data, the information about the location of DR1, the type of data repository on which DR1 resides and the self-reference for DR2 is written into FieldB of DR2. Next, the information about the location of DR2, the type of data repository on which DR2 resides and the self-reference for DR1 is written into FieldA of DR1. An "OK" state is set for the data records and the process ends.

However, if FieldB has data, the self-reference of FieldB is examined to determine if it is correct by double checking to ensure the URL refers back to the same data record. Also, FieldB is examined to determine if it links to DR1. If it does not link to DR1, an error state is set and the process ends. If FieldB's self-reference is correct and Field B links to DR1, the FieldA data and information is written into DR1 with data and information from the corresponding record in DR2. An "OK" state is set for the data records and the process ends. However, if FieldB's self-reference is not correct and Field B links to DR1, FieldB's self-reference is corrected to link to DR2 and the FieldA data and information is written into DR1 with data and information from the location of FieldB in DR2, the type of data repository on which DR2 resides and a self-reference to DR1. An "OK" state is set in the synchronizer for the data records and the process ends.

Referring now to FIG. 3C (labeled procedure "B"), R2 first creates a new data record (DR2). The table will be updated to associate DR1 with DR2. Next, FieldA data and information in DR1 is written into with DR2 information and the new record in DR2 has the appropriate field populated to link back to FieldA in DR1. Finally, the link between DR1 and DR2 is ensured and an "OK" state is set for the data records and the process ends.

Embodiments of the present invention can be implemented across a wide variety of applications and uses. For example, embodiments of the invention could be used with Application Lifecycle Management (ALM) records, project portfolio management (PPM), tickets in an IT help or support system (ITSM), and contact management systems for personal use such as between a mobile device and an email account. It is also possible this approach could be used to synchronize wikis stored in two different wiki systems if pages in the wiki system were treated as data records with fields including meta data about the page.

In another example, embodiments of the invention could be used by a software development team to record bugs that are reported about the applications they produce. For example, the team may use one software system to record bugs that are reported and use a second software system in which to record tests that are used to determine if the applications are executing as desired. To help track tests used to determine if a bug is fixed, the team wants to represent recorded bugs from the first system as recorded defects in the second system. By synchronizing the bugs to defects, both programmers and testers can work with the same information.

Embodiments of the present invention may be used synchronize bugs to defects between the systems. When the synchronization system sees a new bug, the synchronization system presents the change in the bug data record to the system. If this is the first time the bug has been seen for synchronization, the field indicated as providing link data is empty. As part of synchronization, a new defect is created in the second system and the field indicated as providing link data in the second system record is set for the new defect to be the new bug.

An important advantage to the embodiments of the present invention is the ability to synchronize and repair data links across different platforms for all data. Neither repository nor computer system is considered a master record. Instead data records in every platform are analyzed for correctness. If an error is found, the linked data record is repaired without regard to the status or designation of its repository or computer system.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A system to detect and repair errors in synchronization links for data records, the system comprising:
   one or more hardware processors; and
   a synchronizer that, when executed by at least one of the one or more hardware processors:
   maintains a data table containing a first address indicative of a first data record (DR1) of a first data repository (R1) and a second address indicative of a second data record (DR2) of a second data repository (R2), wherein the first data record (DR1) includes a data field (FieldA) that links to one or more other data records associated with the first data record (DR1) and that further includes a self-reference record (SelfRefA), wherein the second data record (DR2) includes a data field (FieldB) that links to one or more associated data records and further includes a self-reference record (SelfRefB), and wherein the second data repository (R2) is distinct and separate from the first data repository (R1); and
   in response to receiving an indication of one or more modifications to the first data record (DR1):
   determines, based at least in part on the data field (FieldA) of the first data record (DR1), that the first data record (DR1) is linked with the second data record (DR2),
   checks the data field (FieldB) of the second data record (DR2) to determine if the second data record (DR2) is linked with the first data record (DR1), and
   if the second data record (DR2) is not linked with the first data record (DR1), corrects the data field (FieldB) of the second data record (DR2) by writing at least the contents of the data field (FieldA) of the first data record (DR1) into the data field (FieldB) of the second data record (DR2) and the second address into the self-reference record (SelfRefB) of the second data record (DR2).

2. The system of claim 1 wherein the first data repository (R1), the second data repository (R2) and the synchronizer all reside on a single computer system.

3. The system of claim 2 wherein the single computer system is a mobile communication device.

4. The system of claim 1, wherein the first data repository (R1) and the second data repository (R2) each reside on respective ones of a plurality of separate computer systems.

5. The system of claim 4, wherein the first data repository (R1) and the second data repository (R2) are communicatively connected over the Internet.

6. The system of claim 5 wherein at least one of the first and second addresses in the data table is a URL.

7. The system of claim 4 wherein at least one of the plurality of separate computer systems is a mobile communication device.

8. The system of claim 1 wherein the synchronizer is responsive to a change in a state of the first data record (DR1).

9. A computer-implemented method for detecting and repairing errors in synchronization links for data records which data records include at least a first data record (DR1) of a first data repository (R1) and a second data record (DR1) of a second data repository (R2), the second data repository (R2) being different from the first data repository (R1), the first data record (DR1) including a data field (FieldA) that links to associated data records and further including a self-reference record (SelfRefA) to detect any errors, and the second data record (DR2) including a data field (FieldB) that links to associated data records and further including a self-reference record (SelfRefB) to detect any errors, the method comprising:
   determining, by one or more computing systems implementing a synchronizer, an association between the first data record (DR1) and the second data record (DR2);
   determining, by the one or more computing systems, an address of the second data record (DR2) by checking a data table that is maintained by the synchronizer and that includes respective addresses of the first data record (DR1) and the second data record (DR2);
   based at least in part on the determined address of the second data record (DR2), checking, by the one or more computing systems, the data field (FieldB) of the second data record (DR2) to determine if the second data record (DR2) is linked with the first data record (DR1); and
   if the second data record (DR2) is not linked with the first data record (DR1), correcting, by the one or more computing systems, the data field (FieldB) of the second data record (DR2) by writing the contents of the data field (FieldA) of the first data record (DR1) and the address of the second data record (DR2) into the second data record (DR2).

10. The method of claim 9, further comprising:
    maintaining the data table on a first computer system on which the first data repository (R1) and the second data repository (R2) both reside.

11. The method of claim 9 wherein determining an association between the first data record (DR1) and the second data record (DR2) includes determining an association between the first data record (DR1) of the first data repository (R1) and the second data record (DR2) of the second data repository (R2) which resides on a different computer system from a computer system on which the first data repository (R1) resides.

12. The method of claim 9, further comprising:
    communicating, by the one or more computing systems and via one or more electronic communications, with the first data repository (R1) and the second data repository (R2) over the Internet.

13. The method of claim 12, further comprising:
    maintaining one or more addresses in the data table in the form of uniform resource locators (URLs).

14. The method of claim 9 wherein determining an association between the first data record (DR1) and the second data record (DR2) includes determining, by the synchronizer which resides on a mobile communication device, an association between the first data record (DR1) of the first data repository (R1) which resides on the mobile communications device, and the second data record (DR2) of the second data repository (R2) which resides on the mobile communications device.

15. The method of claim 9 wherein determining an association between the first data record (DR1) and the second data record (DR2) includes determining an association between the first data record (DR1) of the first data repository (R1) which resides on a first mobile communications device, and the second data record (DR2) of the second data repository (R2) which resides on a distinct and separate second mobile communications device.

16. The method of claim 9, further comprising:
    detecting a change in the first data record (DR1) of the first data repository (R1).

17. The method of claim 9 wherein the synchronizer is responsive to one or more modifications to the first data record (DR1).

\* \* \* \* \*